US012155999B2

(12) United States Patent
Zurbruegg et al.

(10) Patent No.: US 12,155,999 B2
(45) Date of Patent: *Nov. 26, 2024

(54) IN EAR HEARING DEVICE WITH A HOUSING ENCLOSING ACOUSTICALLY COUPLED CHAMBERS

(71) Applicant: SONOVA AG, Staefa (CH)

(72) Inventors: Thomas Zurbruegg, Frauenfeld (CH); Paul Wagner, Portland, OR (US); Antonio Hoelzl, Zurich (CH)

(73) Assignee: Sonova AG, Staefa (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,319

(22) Filed: Feb. 17, 2023

(65) Prior Publication Data

US 2023/0209280 A1 Jun. 29, 2023

Related U.S. Application Data

(63) Continuation of application No. 17/345,988, filed on Jun. 11, 2021, now Pat. No. 11,622,206.

(30) Foreign Application Priority Data

Jun. 18, 2020 (EP) .................................... 20180893

(51) Int. Cl.
*H04R 25/00* (2006.01)

(52) U.S. Cl.
CPC ..... *H04R 25/456* (2013.01); *H04R 2225/023* (2013.01); *H04R 2225/025* (2013.01)

(58) Field of Classification Search
CPC .................. H04R 25/00; H04R 25/456; H04R 2225/023; H04R 2225/025
See application file for complete search history.

(56) References Cited

U.S. PATENT DOCUMENTS

| | | | | |
|---|---|---|---|---|
| 8,027,481 | B2 | 9/2011 | Beard | |
| 11,575,985 | B2 * | 2/2023 | Azmi | H04R 1/2811 |
| 2010/0080400 | A1 | 4/2010 | Sibbald | |
| 2015/0023515 | A1 | 1/2015 | Reimert | |
| 2021/0250709 | A1 | 8/2021 | Hasani | |

FOREIGN PATENT DOCUMENTS

| | | |
|---|---|---|
| CN | 208581337 | 3/2019 |
| EP | 2827608 | 5/2016 |
| EP | 3177033 | 6/2017 |

OTHER PUBLICATIONS

"Extended European Search Report received in EP Application No. 20180893.8 on Nov. 4, 2020."

* cited by examiner

*Primary Examiner* — Suhan Ni
(74) *Attorney, Agent, or Firm* — ALG Intellectual Property, LLC

(57) ABSTRACT

An illustrative hearing device may be at least partially inserted into an ear canal and may include an acoustic transducer having a membrane configured to generate sound waves, a housing enclosing a first chamber and a second chamber acoustically coupled by the membrane, a sound outlet configured to release sound waves from the first chamber into the ear canal, an acoustic port acoustically coupling the second chamber to an ambient environment outside the ear canal, and a mechanical resonator configured to resonate with sound waves at a resonance frequency. The second chamber may be acoustically coupled to the mechanical resonator.

18 Claims, 4 Drawing Sheets

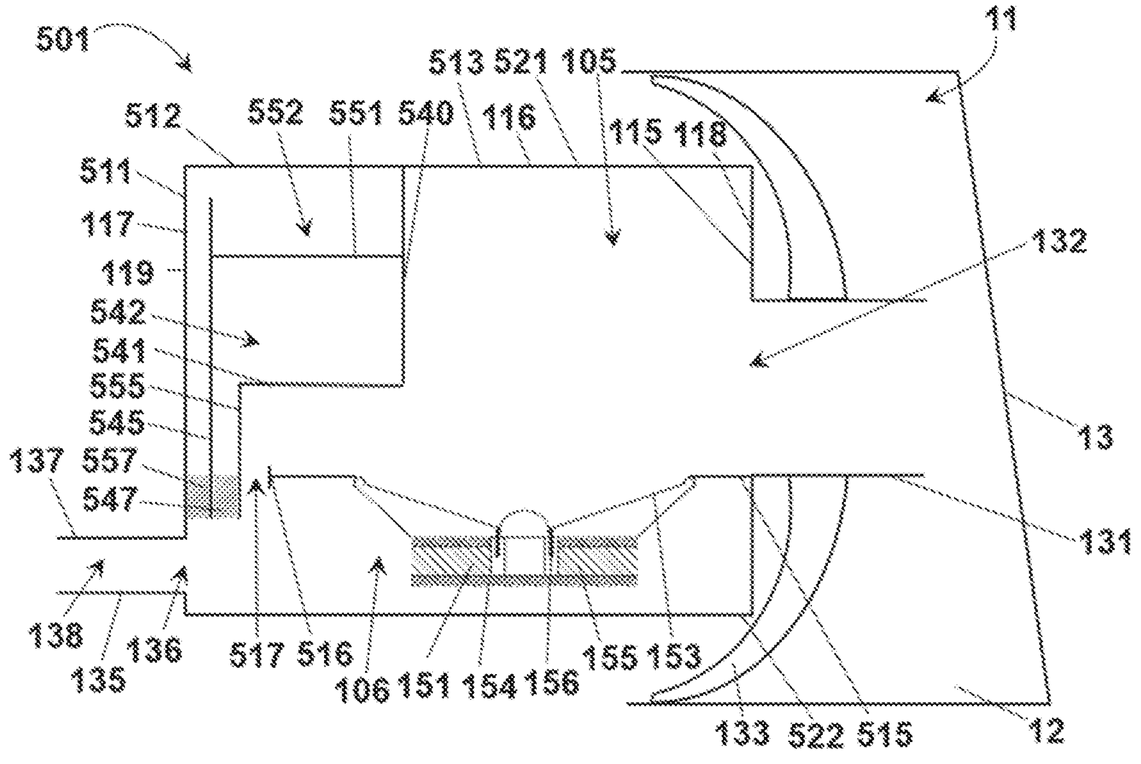
Fig. 5
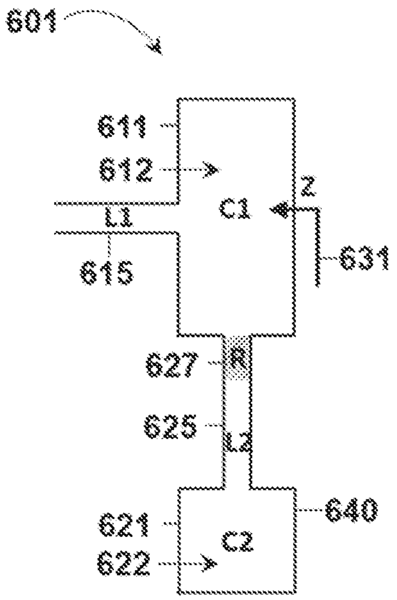
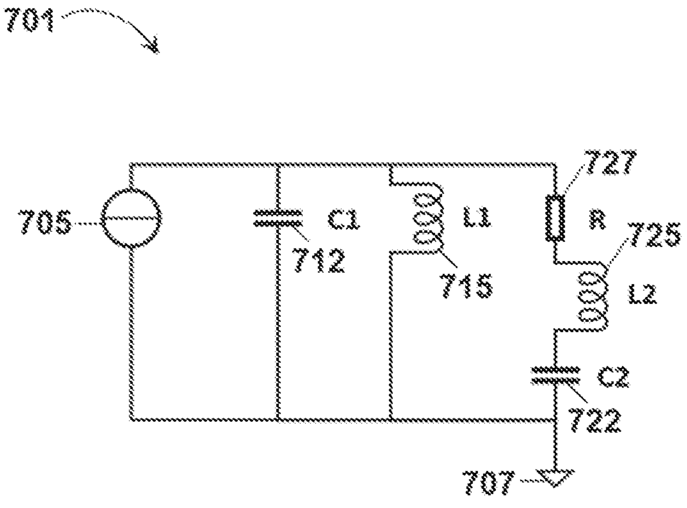
Fig. 6
Fig. 7

IN EAR HEARING DEVICE WITH A HOUSING ENCLOSING ACOUSTICALLY COUPLED CHAMBERS

RELATED APPLICATIONS

The present application is a continuation application of U.S. patent application Ser. No. 17/345,988, filed Jun. 11, 2021, which claims priority to EP Patent Application No. 20180893.8, filed Jun. 18, 2020, each of which is hereby incorporated by reference in its entirety.

BACKGROUND

Hearing devices may be used to improve the hearing capability or communication capability of a user, for instance by compensating a hearing loss of a hearing-impaired user, in which case the hearing device is commonly referred to as a hearing instrument such as a hearing aid, or hearing prosthesis. A hearing device may also be used to produce a sound in a user's ear canal based on an audio signal which may be communicated by a wire or wirelessly to the hearing device. A hearing device may also be used to reproduce a sound in a user's ear canal detected by a microphone. The reproduced sound may be amplified to account for a hearing loss, such as in a hearing instrument, or may be output without accounting for a hearing loss, for instance to provide for a faithful reproduction of detected ambient sound and/or to add sound features of an augmented reality in the reproduced ambient sound, such as in a hearable. Different types of hearing devices configured to be at least partially inserted into an ear canal include earbuds, earphones, hearables, and hearing instruments such as receiver-in-the-canal (RIC) hearing aids, in-the-ear (ITE) hearing aids, invisible-in-the-canal (IIC) hearing aids, and completely-in-the-canal (CIC) hearing aids. The hearing device typically includes a housing accommodating an acoustic transducer configured to generate sound waves. Examples include dynamic "moving coil" transducers, and balanced armature transducers. The housing encloses a first chamber and a second chamber acoustically coupled by a membrane of the acoustic transducer. Sound waves can then be emitted from the membrane into the first chamber located in front of the membrane and into the second chamber located behind the membrane.

The acoustic design of such a housing can influence the acoustic performance of the hearing device. Acoustic parameters that can be tweaked by the design include an acoustic impedance and a frequency response of the sound output into the ear canal. Inherent trade-offs need to be considered, specifically in the design of the second chamber. Some applications require an acoustic port acoustically coupling the second chamber to an ambient environment outside the ear canal in order to provide an acoustic impedance low enough so that it would not compromise the performance. An acoustic mass of the acoustic port added to the acoustic design, however, can impact the frequency response in an undesired way. In particular, a dip in the frequency response within a certain frequency range can be induced by a resonance between the acoustic port and the second chamber resulting in a degraded sound quality.

EP 3 177 033 A1 discloses a hearing device in which an acoustic resistance is placed next to the acoustic port in the second chamber to provide a damping of the resonance which can be helpful to mitigate the frequency dip to a certain extent. Such a damping, however, may also impact the acoustic performance remote from the resonance frequency in an undesired way. Other solutions in the acoustic design would thus be desirable which could be applied alternatively or supplementary, for instance to influence the affected frequency range more directly and/or accurately and/or to enhance the effect of an acoustic damping on the suppression of a frequency dip.

BRIEF DESCRIPTION OF THE DRAWINGS

Reference will now be made in detail to embodiments, examples of which are illustrated in the accompanying drawings. In the drawings:

FIGS. 1-5 are schematic cross sections of a respective hearing device comprising a first chamber and a second chamber acoustically coupled by a membrane of an acoustic transducer, wherein the second chamber is acoustically coupled to a resonant member, in accordance with some embodiments of the present disclosure;

FIG. 6 schematically illustrates an arrangement of acoustic components including acoustically coupled cavities, in accordance with some embodiments of the present disclosure;

FIG. 7 is an electric circuit diagram analogous to the acoustic arrangement illustrated in FIG. 6, in accordance with some embodiments of the present disclosure;

DETAILED DESCRIPTION

Figure 1:
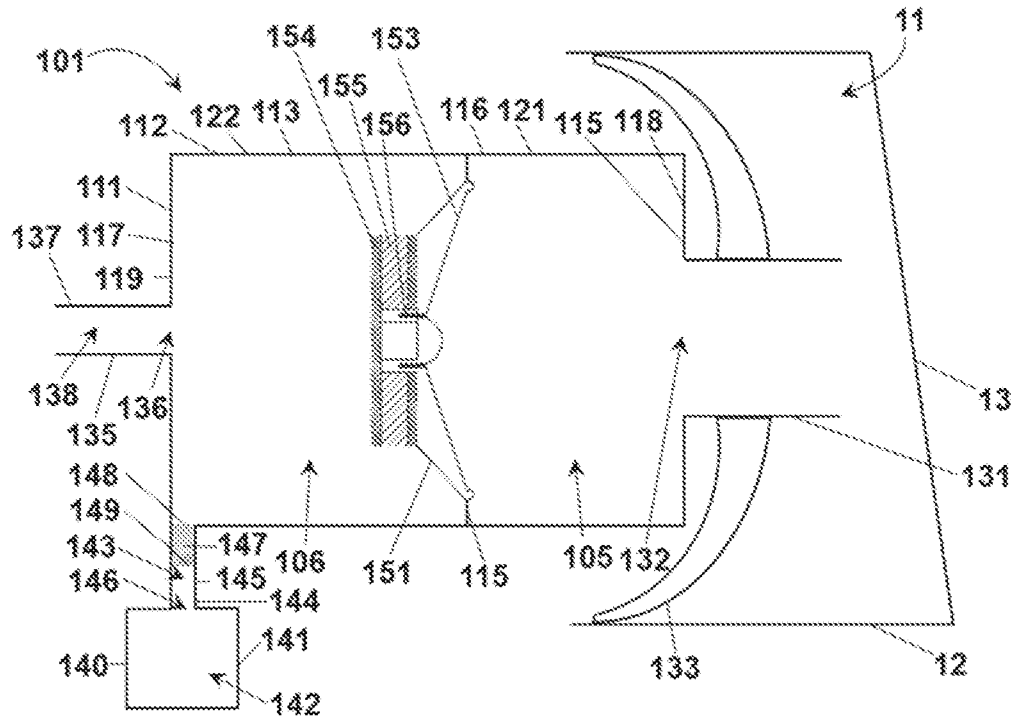

This disclosure relates to a hearing device configured to be at least partially inserted into an ear canal, the hearing device comprising a housing enclosing a first chamber and a second chamber acoustically coupled by a membrane of an acoustic transducer.

It is a feature of the present disclosure to avoid at least one of the above mentioned disadvantages and to equip a hearing device with an acoustic design allowing to influence the frequency response in a customizable way, in particular within a selected frequency range. It is another feature to allow compensation of undesired effects caused by an acoustical coupling of the second chamber to the ambient environment. It is a further feature to propose an acoustic design that can be employed for a stable performance of a feedback and/or feedforward control loop, in particular to enable an invariance of the acoustic properties to a degree required for active noise cancelling (ANC). It is another feature to propose an acoustic design yielding a rather uniform sound delivery of the hearing device when inserted in different ear canals and/or when repeatedly positioned inside an ear canal, at least at a particular frequency range. It is a further feature to provide acoustical constituent parts for a hearing device for an effective adaption of the frequency response. It is yet another feature to allow a convenient and/or space-saving integration of the acoustical constituent parts in the housing.

At least one of these features can be achieved by a hearing device as described herein.

Accordingly, described herein is a hearing device configured to be at least partially inserted into an ear canal, the hearing device comprising an acoustic transducer having a membrane configured to generate sound waves; a housing enclosing a first chamber and a second chamber acoustically coupled by the membrane; a sound outlet configured to release sound waves from the first chamber into the ear canal; an acoustic port acoustically coupling the second chamber to an ambient environment outside the ear canal; and a resonant member configured to resonate with sound waves at a resonance frequency, wherein the second chamber is acoustically coupled to the resonant member. The resonant member can be employed to impact the frequency response of the hearing device in a customizable way, in particular within a desired frequency range including the resonance frequency. For instance, the resonance frequency can be selected to compensate for a frequency dip caused by the acoustic coupling of the second chamber to the ambient environment by the acoustic port.

The acoustic port may be a reactive member effecting an acoustic reactance. The acoustic port may comprise at least one tubular element connecting the second chamber with the ambient environment. It may be that the resonant member comprises a displaceable mass and an elastic coupling counteracting a displacement of the mass, the mass comprising an interaction face at which sound waves can interact with the mass. In some implementations, the resonant member comprises a Helmholtz resonator. In some implementations, the resonant member comprises a mechanical resonator. The second chamber may be acoustically coupled to the interaction face. The displaceable mass and the elastic member may be included in the housing. The displaceable mass and the elastic member may be provided separate from the first chamber.

In some implementations, the acoustic port is a first acoustic port, wherein the resonant member comprises a container enclosing a cavity and a second acoustic port acoustically coupling the second chamber to the cavity. The second acoustic port and the container may form a Helmholtz resonator acoustically coupled to the second chamber by the second acoustic port. A displaceable mass may be provided by an acoustic mass of the second acoustic port, and an elastic member may be provided by a medium inside the cavity.

The second acoustic port may comprise an aperture provided in the container, wherein a cross-section of the aperture is smaller than a cross-section of the cavity adjoining the aperture. The container may be closed except for the aperture. The second acoustic port may comprise a tubular element connecting the second chamber with the cavity through the aperture. The second acoustic port may be a reactive member effecting an acoustic reactance.

In some implementations, said resonance frequency at which the resonant member is configured to resonate with sound waves is a first resonance frequency, wherein the second chamber resonates with the acoustic port at a second resonance frequency, wherein the first resonance frequency deviates from the second resonance frequency at most by one octave. A medium enclosed by the second chamber may resonate with a medium enclosed by the acoustic port at the second resonant frequency. The acoustic port may have an acoustic mass resonating with the second chamber at the second resonant frequency.

Said resonance frequency at which the resonant member is configured to resonate with sound waves may thus be denoted as a first resonance frequency. The resonance frequency at which the second chamber resonates with the acoustic port may thus be denoted as a second resonance frequency.

The resonance frequency at which the resonant member is configured to resonate with sound waves may also be denoted as a resonance frequency of the resonant member. Accordingly, the second chamber may resonate with the acoustic port at a resonance frequency, which may be denoted as a resonance frequency of the second chamber with the acoustic port, wherein the resonance frequency of the resonant member deviates from the resonance frequency of the second chamber with the acoustic port at most by one octave.

In some instances, the first resonance frequency, which may also be denoted as the resonance frequency of the resonant member, deviates from the second resonance frequency, which may also be denoted as the resonance frequency of the second chamber with the acoustic port, by a value close to one octave. This may be advantageous to account for a larger shift in the resonance frequency of the second chamber with the acoustic port which may be caused by various components implemented in the first chamber and/or second chamber. In some instances, the first resonance frequency deviates from the second resonance frequency by a value close to or less than one third-octave. This may be advantageous in cases in which various components included in the first chamber and/or second chamber have a smaller impact on a resonance of the second chamber with the acoustic port.

In some implementations, said resonance frequency at which the resonant member is configured to resonate with sound waves is a first resonance frequency, wherein the second chamber resonates with the acoustic port at a second resonance frequency, wherein the first resonance frequency deviates from the second resonance frequency at most by one third-octave. The resonance frequency at which the resonant member is configured to resonate with sound waves may also be denoted as a resonance frequency of the resonant member. Accordingly, the second chamber may resonate with the acoustic port at a resonance frequency, which may be denoted as a resonance frequency of the second chamber with the acoustic port, wherein the resonance frequency of the resonant member deviates from the resonance frequency of the second chamber with the acoustic port at most by one third-octave.

In some implementations, an acoustic reactance L2 of the second acoustic port and an acoustic capacitance C2 of the cavity is matched to an acoustic reactance L1 of the first acoustic port and an acoustic capacitance C2 of the second chamber by the relation $$0.25 \cdot C1 \cdot L1 \leq C2 \cdot L2 \leq 4 \cdot C1 \cdot L1$$

In some implementations, the resonant member is configured to effect an acoustic resistance R matching the relation $$R = \alpha \cdot \frac{\pi}{2} \cdot \frac{\sqrt{L_1 \cdot C_1}}{C_2}$$

for $0.5 \leq \alpha \leq 2$, wherein L1 is an acoustic reactance of the first acoustic port, C1 is an acoustic capacitance of the second chamber, and C2 is an acoustic capacitance of the cavity. In some instances, the acoustic resistance R matches the above relation for $2/3 \leq \alpha \leq 3/2$. In particular, the factor α may be selected such that it corresponds rather close to a value of one. In this way, a rather constant behaviour of an acoustic impedance measurable at the membrane toward the second chamber may be advantageously provided over a desired frequency range.

In some implementations, at least a portion of the container adjoins the first chamber and/or at least a portion of the container adjoins the second chamber. A membrane plane may be defined as a plane in which a maximum cross sectional area of the membrane extends. In some implementations, the second acoustic port crosses the membrane plane. It may be that at least a portion of the container is located in front of the membrane plane. In some implementations, the housing comprises an inner surface delimiting the first chamber and the second chamber, wherein the second acoustic port at least partially extends along the inner surface.

The container may form an integral part of the housing. In some implementations, the housing comprises a front end and a rear end facing in opposite directions, wherein the sound outlet is provided at the front end and the container extends at least partially across the rear end. In some implementations, the container comprises an annular portion surrounding the first chamber and/or the second chamber.

The first chamber may be located in front of the membrane, and the second chamber may be located behind the membrane. The first chamber and the second chamber may be separated by a partition including the membrane. In some implementations, the container is disposed at least partially in front of the first chamber. In some implementations, the container is disposed at least partially behind the second chamber.

The resonant member may include a resistive member configured to attenuate sound waves interacting with the resonant member. The resistive member may be placed in series with the second acoustic port. At least a portion of the resistive member is provided in the second acoustic port. The resistive member may comprise a first terminal and a second terminal and may be configured to attenuate the sound waves between the first terminal and the second terminal. The resistive member may comprise a sound resistive body comprising the first terminal and the second terminal. The first terminal and/or the second terminal of the resistive member may be disposed in the second acoustic port.

In some implementations, the resonant member is configured to effect an acoustic impedance measurable at the membrane toward the second chamber, wherein, within a third-octave band having a center frequency corresponding to the resonance frequency of the resonant member, an absolute value of the impedance varies by at most a factor of two relative to an absolute value of the impedance at the resonance frequency of the resonant member. In some instances, the impedance varies at most by said factor from the value at the resonance frequency within an octave band having a center frequency corresponding to the resonance frequency of the resonant member. In some instances, the absolute value of the impedance varies by at most a factor of 1.5.

The resonance frequency of the resonant member may comprise a frequency between 100 Hz and 5000 Hz. In some applications, a value of the resonance frequency between 300 Hz and 2000 Hz may be advantageous, in particular in a hearing device configured to provide for an active noise cancelling (ANC). For instance, some hearing devices currently on the market configured to provide ANC may be improved by selecting a value of the resonance frequency between 500 Hz and 1000 Hz.

In some implementations, the hearing device comprises a microphone and a control circuit connected to the microphone, the control circuit configured to provide a control signal to modify the sound waves generated by the membrane, in particular to provide for an active noise cancelling (ANC). The control circuit may be configured to superimpose a sound detected by the microphone with a sound generated by the acoustic transducer. In some implementations, the microphone is configured to be acoustically coupled to the ear canal and the control circuit is an active feedback control circuit. In particular, the microphone may be an ear-canal microphone. In some implementations, the control circuit is an active feedforward control circuit. The microphone may then be configured to detect a sound in the ambient environment. In some implementations, the control circuit comprises an active feedback control circuit, which may be connected to a first microphone acoustically coupled to the ear canal, and an active feedforward control circuit, which may be connected to a second microphone configured to detect ambient sound.

The first chamber may be located in front of the membrane, and the second chamber may be located behind the membrane. The first chamber and the second chamber may be separated by a partition including the membrane. In some instances, the partition may comprise an acoustic coupling between the first chamber and the second chamber in addition to the acoustic coupling provided by the membrane. For instance, the partition may comprise at least one acoustic port and/or acoustic resistance acoustically coupling the first chamber and the second chamber. In some implementations, the container is disposed at least partially in front of the first chamber. In some implementations, the container is disposed at least partially behind the second chamber.

FIG. 1 depicts a hearing device 101 in accordance with some embodiments of the present disclosure. As illustrated, hearing device 101 is configured to be at least partially inserted into an ear canal 11. Hearing device 101 comprises a housing 111 accommodating an acoustic transducer 151. Acoustic transducer 151 comprises a membrane 153 configured to generate sound waves. Housing 111 comprises an enclosure 112 enclosing a first chamber 105 and a second chamber 106 acoustically coupled by membrane 153. First chamber 105 is located in front of membrane 153 and second chamber 106 is located behind membrane 153. Sound waves can be emitted by membrane 153 into first chamber 105 and into second chamber 106. Membrane 153 is configured to transfer pressure variations caused by the sound waves between first chamber 105 and second chamber 106. A partition 115 including membrane 153 separates first chamber 105 and second chamber 106. Partition 115 may include an acoustic coupling between first chamber 105 and second chamber 106 in addition to the acoustic coupling provided by membrane 153. For instance, partition 115 may include at least one acoustic port and/or at least one resistive member extending between first chamber 105 and second chamber 106, as further described below. Enclosure 112 may be implemented as an inner surface 113 of housing 111 delimiting first chamber 105 and second chamber 106.

A geometric shape of housing 111 may be modified within prescribed technical constraints and/or design preferences. In the illustrated example, housing 111 comprises a front wall 115, a rear wall 117 opposing front wall 115, and a lateral wall 116 connecting front wall 115 and rear wall 117. Front wall 115 is provided at a front end 118 of housing 111. Front end 118 is oriented toward an ear drum 13 in ear canal 12 after insertion of hearing device 101 into ear canal 12. Rear wall 117 is provided at a rear end 119 of housing 111 facing away from ear drum 13. A first portion 121 of housing 111 encloses first chamber 105. A second portion 122 of housing 111 encloses second chamber 106. In the illustrated example, first housing portion 121 comprises front wall 115 and a portion of lateral wall 116 extending between front wall 116 and partition 115. Second housing portion 122 comprises rear wall 117 and a portion of lateral wall 116 extending between rear wall 117 and partition 115. Enclosure 112 may comprise inner surface 113 of first housing portion 121 and inner surface 113 of second housing portion 122. In some implementations, as illustrated, front wall 115 is positioned in front of membrane 153, and rear wall 117 is positioned behind membrane 153. Membrane 153 faces ear drum 13 after insertion of hearing device 101 into ear canal 12.

Acoustic transducer 151 may be implemented by any device configured to convert an electrical audio signal into a corresponding sound. In some examples, as illustrated, acoustic transducer 151 can be implemented as a moving coil driver. Moving coil driver 151 comprises membrane 153 and an oscillation drive 154. Oscillation drive 154 comprises a magnet 155 and a voice coil 156. Voice coil 156 is mechanically connected to membrane 153. Voice coil 156 is constrained to move axially through a cylindrical gap in magnet 155. A variable magnetic field can be created by providing a changing electric current through voice coil 156. The variable magnetic field can cause voice coil 155 to move back and forth inside the cylindrical gap by a magnetic interaction between magnet 155 and voice coil 156. A corresponding movement of membrane 153 coupled to voice coil 156 can produce sound waves emanating from an oscillating area of membrane 153. In other examples, acoustic transducer 151 can be implemented as a balanced armature transducer including membrane 153.

A sound outlet 131 is provided at front end 118 of housing 111. Sound outlet 131 leads from first chamber 105 to an exterior of housing 111 through an aperture 132 in front wall 115. Sound outlet 131 is configured to release sound waves from first chamber 105 into ear canal 11 after insertion of hearing device 102 into ear canal 11. Sound outlet 131 may be an integral constituent part of housing 111. Sound outlet 131 may also be provided as a component separate from housing 111. In the illustrated example, sound outlet 131 is arranged in front of acoustic transducer 151 such that membrane 153 faces sound outlet 131. In the illustrated example, sound outlet 131 is a spout. Spout 131 has an open rear end adjoining aperture 132 in front wall 115 and an open front end opposing the rear end. The open front end is free. Sound waves can be released to the exterior through the open front end.

In some implementations, as illustrated, hearing device 101 comprises a sealing member 133 configured to contact an ear canal wall 12 of ear canal 11. In the illustrated example, sealing member 133 is positioned at sound outlet 131. Sealing member 133 may be implemented as an elastic member. Sealing member 133 may be formed as a portion of sound outlet 131 and/or housing 111 configured to contact ear canal wall 12. Sealing member 133 may also be provided as a component separate from sound outlet 131 and/or housing 111 configured to contact ear canal wall 12. At the contact, sealing member 133 may form an acoustical seal with ear canal wall 12. The acoustical seal can acoustically isolate the open front end of sound outlet 131 in ear canal 11 from an ambient environment outside ear canal 11, at least to some extent. In this way, ambient sound from the ambient environment outside ear canal 11 can be at least partially blocked from entering an inner region of ear canal 11.

An acoustic port 135 is provided at housing 111. Acoustic port 135 acoustically couples second chamber 106 with an ambient environment outside housing 111. In the illustrated example, acoustic port 135 is provided at rear end 119 of housing 111. In other examples, acoustic port 135 can be provided at another housing portion, for instance at lateral wall 116. Acoustic port 135 comprises an aperture 136 in housing 111 leading from second chamber 106 toward the ambient environment. In the illustrated example, acoustic port 135 further comprises a tubular element 137 disposed at aperture 136. In other examples, acoustic port 135 may be constituted by aperture 136 or a plurality of apertures 136 leading from second chamber 106 toward the ambient environment. Tubular element 137 has an open front end adjoining second chamber 106 and an open rear end opposing the front end. The rear end is free. Sound waves can be released to the ambient environment through the rear end. Acoustic port 135 has an acoustic mass. The acoustic mass may depend on a ratio of a length to a cross section of a volume 138 enclosed by acoustic port 135 multiplied by a mass density of a sound conducting medium filling volume 138, for instance air. Acoustic port 135 constitutes a reactive member between second chamber 106 and the ambient environment. Acoustic port 135 is a first acoustic port.

Hearing device 101 further comprises a resonant member 140. Second chamber 106 is acoustically coupled to resonant member 140. Resonant member 140 comprises a container 141 enclosing a cavity 142 and a second acoustic port 145 acoustically coupling second chamber 106 to cavity 142. Second acoustic port 145 comprises an aperture 146 in container 141. In the illustrated example, container 141 is closed except aperture 146. In other examples, aperture 146 is a first aperture and container 141 may comprise at least a second aperture. In some instances the second aperture may be acoustically coupled to second chamber 106. In some instances, the second aperture may be acoustically coupled to first chamber 105 and/or the ambient environment. In the illustrated example, second acoustic port 145 further comprises a tubular element 144. In other examples, second acoustic port 145 may be constituted by aperture 146 or a plurality of apertures 146 leading from second chamber 106 to cavity 142. Tubular element 144 has an open front end adjoining second chamber 106 and an open rear end adjoining cavity 142. Second acoustic port 145 has an acoustic mass. Second acoustic port 145 constitutes a reactive member between second chamber 106 and cavity 142. A cross-section of aperture 146 is smaller than a cross-section of cavity 142 adjoining aperture 146.

Resonant member 140 is a Helmholtz resonator. To illustrate, second acoustic port 145 may form a neck of container 141 leading to container 141 with a narrower cross section of an inner volume enclosed by the neck. A medium inside the inner volume of the neck can then be caused to vibrate due to an elastic coupling with container 141 by a medium inside cavity 142. The medium may be air. In some implementations, container 141 and/or second acoustic port 145 of resonant member 140 forms an integral part of housing 101. In some implementations, container 141 and/or second acoustic port 145 is provided as a component separate from housing 101.

Resonant member 140 further comprises a resistive member 147. Resistive member 147 comprises a sound resistive body having a first terminal 148 and a second terminal 149. Resistive member 147 is configured to attenuate sound waves between first terminal 148 and second terminal 149. Resistive member 147 is placed in series with second acoustic port 145. First terminal 148 is oriented toward second chamber 106 and second terminal 149 is oriented toward cavity 142. In the illustrated example, first terminal 148 and second terminal 149 of resistive member 147 are disposed inside second acoustic port 145. In other examples, first terminal 148 and/or second terminal 149 can be disposed outside second acoustic port 145. In other examples, resistive member 147 may be placed in front of second acoustic port 145, in particular inside second chamber 106. In other examples, resistive member 147 may be placed behind second acoustic port 145, in particular inside cavity 142.

Resistive member 147 can be selected to provide a desired value of an acoustic resistance in the acoustic coupling between second chamber 106 and cavity 142. The acoustic coupling is provided via second acoustic port 145 which may be a reactive member having predominantly reactive properties. In some implementations, in which no acoustic resistance is desired in the acoustic coupling between second chamber 106 and cavity 142, resistive member 147 may be omitted. In some implementations, in which second acoustic port 145 inherently has reactive properties and resistive properties, resistive member 147 may also be omitted or may be selected to increase the resistive properties of second acoustic port 145 to a desired value.

In some implementations, acoustic port 135 is employed for a venting of second chamber 106 to the ambient environment, in particular to relieve air pressure that could be built up within second chamber 106 and/or within the ear canal with respect to the ambient environment. Such a venting can be useful, for instance, to achieve an increased frequency response in a rather stable manner, in particular at a lower frequency range. The acoustic mass of acoustic port 135, however, can interact with a sound conducting medium in second chamber and/or the ambient environment to establish a resonant acoustic circuit having at least one resonance. The resonance may produce an undesired dip of the frequency response, in particular at a higher frequency range. The resonance can be counteracted, however, by providing resonant member 140 with a corresponding resonance frequency. In this way, a frequency response of hearing device 101 can be improved. Resonant member 140 can be further configured to effect an acoustic resistance, in particular by resistive member 147, which can provide a further improvement of the frequency response.

Hearing device 101 may include additional components as may serve a particular implementation. For instance, hearing device 101 may include a processing unit, which may include a memory. Hearing device 101 may include a signal processing circuitry configured to process an audio signal which is output by acoustic transducer 151. Hearing device 101 may include a feedback control circuit and/or a feedforward control circuit connected to acoustic transducer 151. The feedback control circuit and/or the feedforward control circuit can comprise a microphone, in particular an ear canal microphone, configured to detect sound inside the ear canal and to provide an audio signal based on the detected sound. The feedback control circuit and/or feedforward control circuit may be configured to perform an active noise control (ANC) of the sound waves generated by acoustic transducer 151, for instance based on an evaluation of the audio signal. Hearing device 101 may also include at least one microphone, in particular a microphone configured to detect sound from the ambient environment outside the ear canal, and/or an inertial sensor and/or an optical sensor and/or a temperature sensor and/or an electromagnetic field sensor and/or a biometric sensor and/or other components commonly provided in a hearing device.

Those and/or other components may be accommodated in housing 111, in particular inside first chamber 105 and/or second chamber 106. Those components may also be accommodated in a portion of housing 111 separate from first chamber 105 and/or second chamber 106, or they may be provided in a unit separate from housing 111, which may be communicatively coupled with acoustic transducer 151. A volume of first chamber 105 and a volume of second chamber 106 may be defined as a space in first chamber 105 and a space in second chamber 106 filled with a sound conducting medium such as air. The volume of first chamber 105 and the volume of second chamber 106 may exclude a space occupied by components provided inside first chamber 105 and second chamber 106, in particular a space occupied by acoustic transducer 151.

Figure 2:
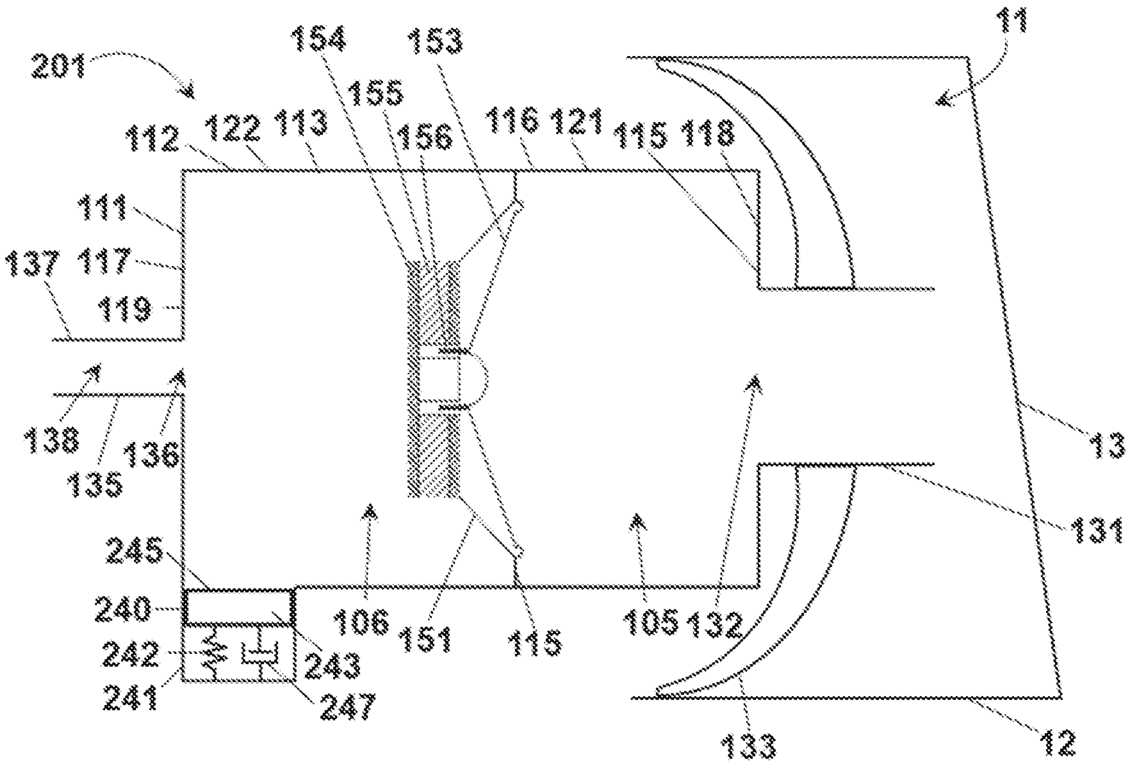

FIG. 2 illustrates a hearing device 201 in accordance with some embodiments of the present disclosure. Hearing device 201 comprises a resonant member 240. Resonant member 240 is a mechanical resonator. Resonant member 240 is implemented in the place of Helmholtz resonator 140 of hearing device 101 illustrated in FIG. 1. In other examples, resonant member 240 may be implemented in addition to Helmholtz resonator 140.

Resonant member 240 comprises a solid body 243 moveably coupled to housing 111. Body 243 has a surface 245 oriented toward second chamber 106 at which sound waves can interact with body 243. Body surface 245 is thus acoustically coupled to second chamber 106. Interaction of sound waves from second chamber 106 with body surface 245 can effect a displacement of body 245. Resonant member 240 further comprises an elastic member 242. Elastic member 242 is configured to provide a force counteracting a displacement of body 243. Elastic member 242 may also serve as a suspension of body 243 at housing 111. For instance, elastic member 242 is a spring. Body 243 and elastic member 242 may thus constitute a spring-mass system adapted for resonant oscillations. In this way, resonant member 240 can resonate with sound waves in second chamber 106 at a resonance frequency. Resonant member 240 further comprises a damper 247 resisting the motion of body 243. In the illustrated example, resonant member 240 is enclosed by a casing 241 separate from second chamber 106. In other examples, resonant member 240 may be at least partially disposed inside second chamber 106.

Helmholtz resonator 140 and mechanical resonator 240 may be equivalently applied. Each resonant member 140, 240 comprises a displaceable mass which may be implemented by an acoustic mass of acoustic port 145 and/or by a mass of body 243. Each respective mass comprises an interaction face implemented by body surface 245 and/or by the front end of acoustic port 145 at which sound waves can interact with the mass. Each resonant member 140, 240 further comprises an elastic coupling configured to exert a force counteracting a displacement of the mass, which may be provided by a medium inside cavity 142 enclosed by container 141 and/or by elastic member 242. Each resonant member 140, 240 further comprises a resistive member which may be implemented by acoustic resistance 147 and/or damper 247.

Figure 3:
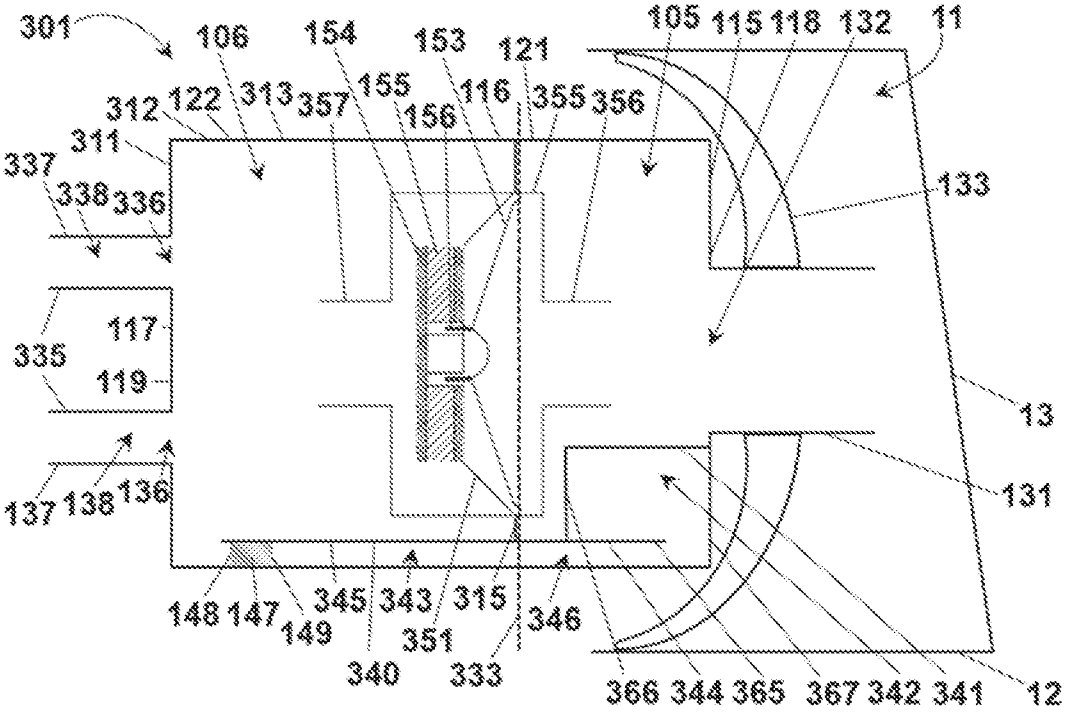

FIG. 3 illustrates a hearing device 301 in accordance with some embodiments of the present disclosure. Hearing device 301 comprises a housing 311 accommodating an acoustic transducer 351. Acoustic transducer 351 comprises a casing 354 enclosing membrane 153 and an oscillation drive 154. Casing 354 is integrated with a partition 315 separating first chamber 305 and second chamber 306 such that first chamber 305 is located in front of membrane 153 and second chamber 306 is located behind membrane 153. Casing 354 comprises a front port 355 located in first chamber 105 and a rear port 356 located in second chamber 106. Sound waves emitted by membrane 153 into first chamber 105 can be released from an inner volume enclosed by casing 354 into a remaining volume of first chamber 105 through front port 355. Sound waves emitted by membrane 153 into second chamber 106 can be released from an inner volume enclosed by casing 354 into a remaining volume of second chamber 106 through rear port 356. Acoustic transducers 151, 351 illustrate different construction types of an acoustic transducer in an exemplary way. In principle, however, any other type of an acoustic transducer may be implemented in the place of acoustic transducers 151, 351.

An acoustic port 335 is provided at housing 311. Acoustic port 335 acoustically couples second chamber 106 with an ambient environment outside housing 311. Acoustic port 335 comprises aperture 136 and tubular element 137 leading from second chamber 106 to the ambient environment, as described above. Aperture 136 is a first aperture 136 of acoustic port 335, wherein acoustic port 335 comprises a second aperture 336 in housing 311 leading from second chamber 106 toward the ambient environment. Tubular element 137 is a first tubular element 137 of acoustic port 335, wherein acoustic port 335 comprises a second tubular element 337 at second aperture 336. Second tubular element 337 has a front end adjoining second chamber 106 and a rear end through which sound waves can be released to the ambient environment. An acoustic mass of acoustic port 335 corresponds to the combined acoustic mass of first tubular element 137 and second tubular element 337. Acoustic port 335 constitutes a reactive member between second chamber 106 and the ambient environment. Acoustic port 335 is a first acoustic port.

Hearing device 301 further comprises a resonant member 340. Second chamber 106 is acoustically coupled to resonant member 340. Resonant member 340 is a Helmholtz resonator comprising a container 341 enclosing a cavity 342 and a second acoustic port 345. Second acoustic port 345 acoustically couples second chamber 106 to cavity 342. Second acoustic port 345 comprises an aperture 346 in container 341 and a tubular element 344 at aperture 346. A front end of tubular element 344 is located in second chamber 106 and a rear end of tubular element 344 is located in cavity 342. In the illustrated example, the rear end of tubular element 344 is spaced from aperture 346 in container 341. Tubular element 344 extends through aperture 346. Tubular element 344 thus comprises an end portion 365 projecting inside cavity 342. Second acoustic port 345 is a reactive member. Second acoustic port 345 has an acoustic mass. Resonant member 140 further comprises resistive member 147 placed in series with second acoustic port 345.

In the illustrated example, second acoustic port 345 extends along an inner surface 313 of housing 311. Inner surface 313 forms an enclosure 312 delimiting first chamber 105 and second chamber 106. Chambers 105, 106 are thus partially enclosed by second acoustic port 345. An outer surface of second acoustic port 345 partially delimits first chamber 105 and second chamber 106. This may allow to save space and/or material for an integration of second acoustic port 345 into housing 311. In other examples, second acoustic port 345 can be provided at a distance from inner surface 313 of housing 311, for instance in partition 315. In the illustrated example, second acoustic port 445 extends in a diagonal direction relative to partition 315.

Container 341 comprises a first portion 366 adjoining first chamber 105. First chamber 105 is partially enclosed by first container portion 366. An outer surface of first container portion 366 constitutes a part of inner surface 313 of housing 311. This can also contribute to a space saving integration of resonant member 140 in housing 311. A resulting compact size of housing 311 is particularly desirable due to space restrictions when housing 311 is intended to be worn at an ear. In the illustrated example, container 341 comprises a second portion 367 facing away from first chamber 105. Second container portion 367 may be integrated with front wall 115 and/or lateral wall 116. In other examples, container 341 may be formed by container portion 366 adjoining first chamber 105 and/or second chamber 106. In the illustrated example, container 341 faces partition 315, in particular membrane 153, at first container portion 366. Such an arrangement can also contribute to a compact design of housing 311.

A membrane plane 333 is defined as a plane in which a maximum cross sectional area of membrane 153 extends. In the illustrated example, second acoustic port 345 crosses membrane plane 333. Container 341 is located in front of membrane plane 333. Such a position of container 341 can facilitate the acoustic design of a rear portion of housing 311, in particular to allow a desired size and/or shape of second chamber 106 optimized for desired acoustic properties, and still provide for a rather compact housing design. In other examples, container 341 can be at least partially located behind membrane plane 333.

Figure 4:
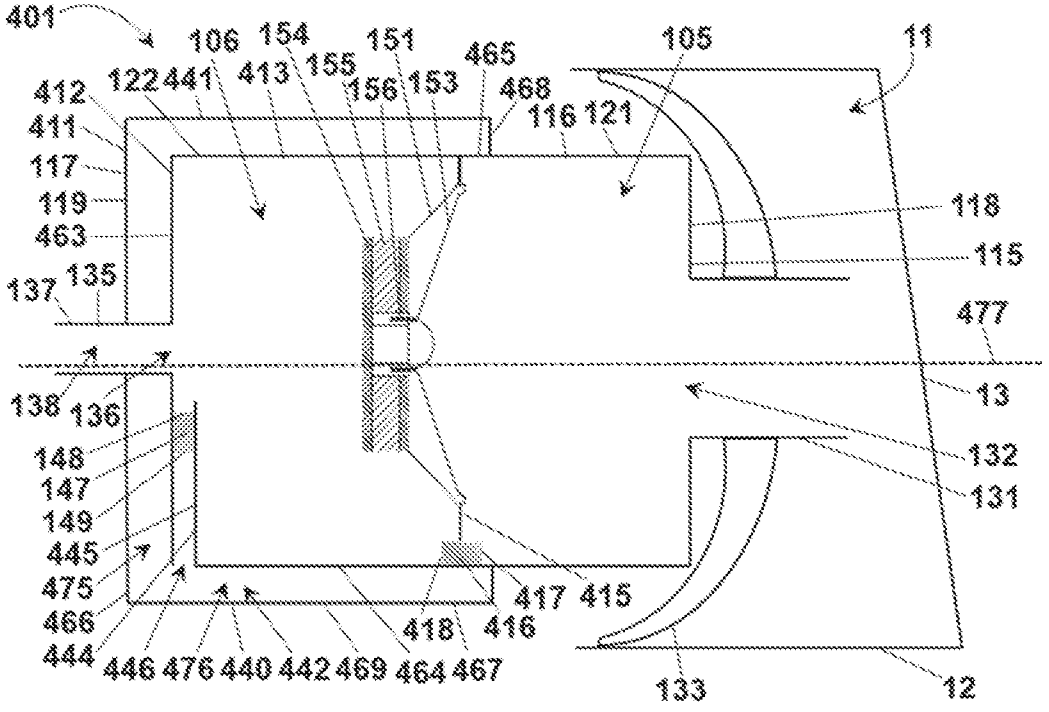

FIG. 4 illustrates a hearing device 401 in accordance with some embodiments of the present disclosure. Hearing device 401 comprises a housing 411 accommodating acoustic transducer 151. A partition 415 comprising membrane 153 separates first chamber 105 in front of partition 415 and second chamber 106 behind partition 415 such that first chamber 105 and second chamber 106 are acoustically coupled by membrane 153. Partition 415 further comprises a resistive member 416 acoustically coupling first chamber 105 and second chamber 106. Resistive member 416 is placed in parallel with membrane 153. Resistive member 416 is configured to attenuate sound waves between a first terminal 417 and a second terminal 418. First terminal 417 adjoins first chamber 105 and second terminal 418 adjoins second chamber 106. Resistive member 416 comprises a sound resistive body extending between first terminal 417 and second terminal 418.

Hearing device 401 further comprises a resonant member 440. Second chamber 106 is acoustically coupled to resonant member 440. Resonant member 440 is a Helmholtz resonator. A second acoustic port 445 of resonant member 440 connects second chamber 106 to a cavity 442 enclosed by container 441 of resonant member 440. Second acoustic port 445 comprises an aperture 446 in container 441 and a tubular element 444 leading to aperture 446. In the illustrated example, second acoustic port 445 extends along an inner surface 413 of housing 411. Inner surface 413 provides an enclosure 412 delimiting first chamber 105 and second chamber 106. In the example, second acoustic port 445 extends substantially in parallel to partition 415. Second acoustic port 445 is a reactive member.

Container 441 comprises a first portion 463, 464 adjoining second chamber 106. In the illustrated example, the first container portion comprises a first wall section 463 facing rear end 119 of housing 411 and a second wall section 464 extending in a direction between rear end 119 and front end 118 of housing 411. Second chamber 106 is partially enclosed by first container portion 463, 464. Container 441 comprises a second portion 465 adjoining first chamber 105. Second container portion 465 comprises a third wall section adjoining second wall section 464 of the first container portion at partition 415 and extending toward front end 118 of housing 411. First chamber 105 is partially enclosed by second container portion 465. First container portion 463, 464 and second container portion 465 constitute a part of an inner surface 413 of housing 411 forming an enclosure 412 delimiting first chamber 105 and second chamber 106. Container 341 comprises a third portion 466, 467, 468 contactless from first chamber 105 and second chamber 106.

Container 341 extends partially across rear 119 of housing 411. Such an arrangement can also allow a compact design of housing 411. In the illustrated example, the third container portion comprises a fourth wall section 466 extending across rear end 119 of housing 411, a fifth wall section 467 extending from rear end 119 toward front end 118, and a sixth wall section 468 enclosing cavity 442 toward front end 118. Third container portion 466, 467, 468 may be at least partially integrated with rear wall 117 and/or lateral wall 116 of housing 411. Cavity 442 comprises a first cavity portion 475 delimited by first wall section 463 and fourth wall section 466. In the illustrated example, first cavity portion 475 is located behind second chamber 106 relative to membrane 153.

Container 341 comprises an annular portion 469 surrounding second chamber 106 and partially surrounding first chamber 105. Annular portion 469 comprises second wall section 464, third wall section 465 and fifth wall section 467 of container 341. For instance, annular portion 469 may have a cylindrical shape around a longitudinal axis 477 extending between rear end 119 and front end 118 of housing 411. Such an arrangement may also contribute to a compact design of housing 411. Cavity 442 comprises a second cavity portion 476 enclosed by annular portion 469 of container 341.

In some instances, as illustrated, a portion of housing 411 including container 341 may protrude from a remaining portion of housing 411 in a direction perpendicular to longitudinal axis 477 extending between rear end 119 and front end 118 of housing 411. In other instances, the portion of housing 411 including container 341 may have a circumferential surface equally spaced from longitudinal axis 477 as compared to the remaining portion of housing 411. In some instances, as illustrated, a cross section of container 341 enclosing first cavity portion 475 and second cavity portion 476 has a U-shape. In other instances, container 341 may be formed by annular portion 469, in particular such that cavity 442 enclosed by container 341 would be constituted by second cavity portion 476. In other instances, container 341 may only extend across rear end 119 of housing 411, in particular such that cavity 442 enclosed by container 341 would be constituted by first cavity portion 475. In other instances, annular portion 469 may only surround one of first chamber 105 and second chamber 106.

FIG. 5 illustrates a hearing device 501 in accordance with some embodiments of the present disclosure. Hearing device 501 comprises a housing 511 accommodating acoustic transducer 151. A partition 515 comprising membrane 153 separates first chamber 105 in front of partition 515 and second chamber 106 behind partition 515. First chamber 105 and second chamber 106 are acoustically coupled by membrane 153. Partition 515 extends between front end 118 and rear end 119 of housing 511. Membrane 153 faces lateral wall 116. A first portion 521 of housing 511 encloses first chamber 105. A second portion 522 of housing 511 encloses second chamber 106. Membrane 153 is oriented in a transverse direction relative to ear drum 13 after insertion of hearing device 101 into ear canal 12.

Partition 515 further comprises an inner acoustic port 516 acoustically coupling first chamber 105 and second chamber 106. Inner acoustic port 516 is placed in parallel with membrane 153. Inner acoustic port 516 comprises an aperture 517 in partition 515 interconnecting first chamber 105 and second chamber 106. Inner acoustic port 516 may further comprise a tubular element at 517. Inner acoustic port 516 may be a reactive member. Partitions 115, 315, 415, 515 described above may be applied interchangeably in any of hearing devices 101, 201, 301, 401, 501. Partitions 115, 315, 415, 515 may also include a plurality of resistive members 416 and/or apertures 517 acoustically coupling first chamber 105 and second chamber 106 to account for desired acoustic properties of hearing devices 101, 201, 301, 401, 501.

Hearing device 501 further comprises a resonant member 540. Resonant member 540 comprises a plurality of containers 541, 551 each enclosing a cavity 542, 552, and a plurality of second acoustic ports 545, 555 acoustically coupling second chamber 106 to each cavity 542, 552. A Helmholtz resonator is formed by each container 541, 551 and the second acoustic port 545, 555 adjoining the cavity 542, 552 enclosed by 541, 551. Resonant member 540 further comprises a plurality of resistive members 547, 557 placed in series with a respective second acoustic port 345. A resonance frequency and/or acoustic reactance and/or acoustic resistance of each Helmholtz resonator can be adjusted to account for desired acoustic properties of hearing device 501, for instance a desired frequency response at two well separated frequency ranges. In particulars, containers 541, 551, second acoustic ports 545, 555, and resistive members 547, 557 can be selected accordingly to provide for these properties.

In some implementations, a combination of a plurality of resonant members 140, 240, 340, 440, 540 can be provided in any of hearing devices 101, 201, 301, 401, 501 described above. In some implementations, first acoustic port 135 and/or first acoustic port 335 can be provided in any of hearing devices 101, 201, 301, 401, 501 described above. In some implementations, at least one resistive member is provided configured to attenuate sound waves between second chamber 106 and the ambient environment. In some instances, first acoustic port 135, 335 may be a reactive member having an acoustic reactance and the resistive member is placed in series with first acoustic port 135, 335. In some instances, the resistive member is placed in parallel with first acoustic port 135, 335. For instance, the resistive member can include a first terminal adjoining second chamber 106 and a second terminal adjoining the ambient environment, wherein the resistive member is configured to attenuate sound waves between the first terminal and the second terminal. In this way, acoustic properties of hearing device 101, 201, 301, 401, 501, for instance a frequency response of the output sound, may be further adapted to a desired behaviour. In particular, the resistive member may be exploited to provide a damping of a resonance between first acoustic port 135, 335 and second chamber 106.

FIG. 6 illustrates an acoustic arrangement 601 disposed in an ambient environment of a sound conducting medium such as air. Arrangement 601 comprises a first container 611 enclosing a first cavity 612, and a second container 621 enclosing a second cavity 622. First cavity 612 is acoustically coupled to the ambient environment by a first acoustic port 615. Second cavity 622 is acoustically coupled to first cavity 612 by a second acoustic port 625. A resistive member 627 is placed in series with second acoustic port 625. First cavity 612, second cavity 622, first acoustic port 615, and second acoustic port 625 are filled with the air. First cavity 612 has an acoustic capacitance C1. Second cavity 622 has an acoustic capacitance C2. First acoustic port 615 is a reactive member having an acoustic reactance L1. Second acoustic port 625 is a reactive member having an acoustic reactance L2. Resistive member 627 has an acoustic resistance R. A resonant member 640 comprises second container 621 enclosing second cavity 622 and second acoustic port 625 acoustically coupling first cavity 612 to second cavity 622. Resonant member 640 further comprises acoustic resistance R.

The acoustic capacitance C may be derived as:

$$C = \frac{V}{\rho \cdot c^2}$$

wherein c is the speed of sound, p is the density of air, and V represents an enclosed volume filled by air. Capacitance C1 of first cavity 612 can be calculated by setting V as the volume of first cavity 612 filled by air. Capacitance C2 of second cavity 622 can be calculated by setting V as the volume of second cavity 622 filled by air.

The acoustic reactance L may be derived as:

$$L = \frac{\rho \cdot l}{A}$$

wherein 1 represents a length and A represents a cross section of a volume enclosed by a tubular element filled by air. Reactance L1 of first acoustic port 615 can be calculated by setting 1 as the length and A as the cross section of first acoustic port 615. Reactance L2 of second acoustic port 625 can be calculated by setting 1 as the length and A as the cross section of second acoustic port 625.

A resonance frequency f may be derived as $$f = \frac{1}{2\pi\sqrt{L \cdot C}}$$

wherein π is a constant corresponding to a ratio of a circumference of a circle, and L and C may be derived by the equations above. In particular, first cavity 612 may resonate with first acoustic port 615 at a resonance frequency f1, which may be calculated by setting L as L1, and C as C1. A resonance frequency f2 of resonant member 640 may be calculated by setting L as L2, and C as C2.

Arrangement 601 may serve as a simplified and/or idealized approximation of acoustic properties of hearing device 101, 201, 301, 401, 501. In this approximation, first cavity 612 may be associated with second chamber 106 and second cavity 622 may be associated with cavity 142, 342, 442, 542, 552 enclosed by container 141, 341, 441, 541, 551. First acoustic port 615 may be associated with first acoustic port 135, 335, and second acoustic port 625 may be associated with second acoustic port 145, 345, 445, 545, 555. Resistive member 627 may be associated with intrinsic resistive properties of second acoustic port 625 and/or with resistive member 147, 547, 557. Resonant member 640 may be associated with resonant member 140, 240, 340, 440, 540.

FIG. 7 illustrates a diagram of an electric circuit 701 analogous to acoustic arrangement 601 illustrated in FIG. 6. Circuit 701 comprises a series placement of a capacitance 722, an inductance 725, and a resistance 727. The series placement of electric components 722, 725, 727 may be associated with the series placement of second cavity 622, second acoustic port 625, and resistive member 627 in acoustic arrangement 601 forming resonant member 640. A capacitance 712 and an inductance 715 are placed in parallel to one another and placed in parallel with the series placement of components 722, 725, 727. The parallel placement of components 712, 715 may be associated with the corresponding placement of first cavity 612 and first acoustic port 615 in acoustic arrangement 601. A current source 705 is placed in parallel with the series placement of components 722, 725, 727 and with components 712, 715, which are all linked to a common potential 707.

The acoustic capacitance C1 of first cavity 612 may thus be associated with a value of capacitance 712 and the acoustic capacitance C2 of second cavity 622 with a value of capacitance 722. The acoustic reactance L 1 of first acoustic port 615 may be associated with a value of inductance 715, and the acoustic reactance L2 of second acoustic port 625 may be associated with a value of inductance 725. Acoustic resistance R of resistive member 627 may be associated with a value of resistance 727.

Acoustic arrangement 601 and the analogy with electric circuit 701 may be employed to model desired acoustic properties of hearing device 101, 201, 301, 401, 501 in an idealized and/or simplified way, as exemplified in the subsequent description.

In some implementations, a resonance frequency f2 of the resonating member comprising second acoustic port 625 and second cavity 622 can be matched to a resonance f1 between first cavity 612 and first acoustic port 615. The frequency matching in acoustic arrangement 601 may be achieved by the following relation:

$$C1 \cdot L1 = C2 \cdot L2$$

In a real device, as exemplified by hearing device 101, 201, 301, 401, 501, this theoretically derived condition may be implemented by requiring that a resonance frequency f1, at which second chamber 106 resonates with first acoustic port 135, 335, deviates from a resonance frequency f2 of resonant member 140, 240, 340, 440, 540, 640 at most by an acoustic interval of one octave. This requirement may also be expressed as $$\frac{1}{2} \cdot f1 \leq f2 \leq 2 \cdot f1$$

Resonance frequency f2 may be denoted as a first resonance frequency. Resonance frequency f1 may be denoted as a second resonance frequency. The resonance frequencies f1, f2 may be derived based on an acoustic reactance L1 of first acoustic port 135, 335, an acoustic reactance L2 of second acoustic port 135, 335, an acoustic capacitance C1 of second chamber 106, and an acoustic capacitance C2 of cavity 142, 242, 342, 442, 542, 552.

In some implementations, the condition may be implemented in a real device by requiring that resonance frequency f1, at which second chamber 106 resonates with first acoustic port 135, 335, deviates from resonance frequency f2 of resonant member 140, 240, 340, 440, 540, 640 at most by an acoustic interval of one third-octave. This requirement may also be expressed as $$\frac{1}{\sqrt[3]{2}} \cdot f1 \leq f2 \leq \sqrt[3]{2} \cdot f1$$

In some implementations, a damping may be applied to cause a desired effect of the resonating member on the frequency response, for instance to avoid unwanted peaks and/or valleys in the frequency response. The damping may be achieved in acoustic arrangement 601 by a resistance R matching the equation relation:

$$R = \frac{\pi}{2} \cdot \frac{\sqrt{L1 \cdot C1}}{C2}$$

Applying this relation in a real device, as exemplified by hearing device 101, 201, 301, 401, 501, may require that resonant member 140, 240, 340, 440, 540, 550 is configured to effect an acoustic resistance R matching the above expression within a factor α of such that $$R = \alpha \cdot \frac{\pi}{2} \cdot \frac{\sqrt{L_1 \cdot C_1}}{C_2}$$

for an acoustic reactance L1 of first acoustic port 135, 335, an acoustic capacitance C1 of second chamber 106, and an acoustic capacitance C2 of cavity 142, 342, 442, 542, 552. In some instances, to achieve a desired amount of the damping, an acoustic resistance R may be selected in which a value of α is included in the interval $0.5 \leq \alpha \leq 2$. In some instances, a desired damping may be provided by a value of a included in the interval $2/3 \leq \alpha \leq 3/2$.

Resonant member 140, 240, 340, 440, 540, 550 may be configured to effect the acoustic resistance R at second acoustic port 145, 345, 445, 545, 555. Second acoustic port 145, 345, 445, 545, 555 can be a reactive member characterized by an acoustic reactance L2, as described above. In some instances, second acoustic port 145, 345, 445, 545, 555 may have resistive properties in addition to the reactive properties, wherein the resistive properties at least partially account for acoustic resistance R. In some instances, acoustic resistance R may be at least partially provided by resistive member 147, 547, 557 placed in series with second acoustic port 145, 345, 445, 545, 555.

Figure 8:
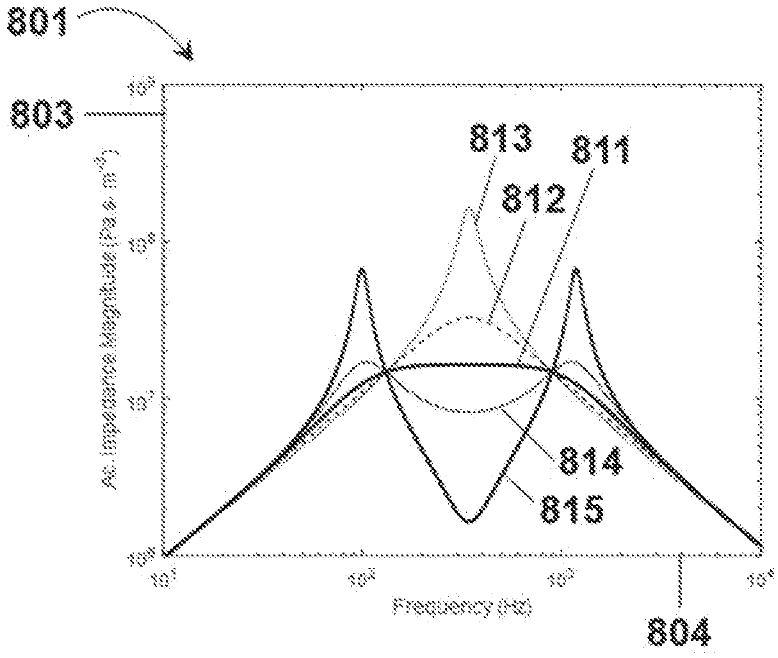
FIG. 8 is an exemplary graph displaying a frequency dependency of an impedance of the acoustic arrangement illustrated in FIG. 6 and the electric circuit illustrated in FIG. 7 for different resistance values, in accordance with some embodiments of the present disclosure.

FIG. 8 is a graph 801 illustrating a frequency dependency of an impedance Z of acoustic arrangement 601 and electric circuit 701 for different values R of resistance 627, 727. A frequency f is displayed over an axis of abscissas 804 and an absolute value of the acoustic impedance Z is displayed over an axis of ordinates 803. A first impedance curve 811 can be obtained by matching resistance R to the above equation, for a value of a equal or close to one. Impedance curve 813 exhibits a substantially flat shape in a frequency range between approximately 100 Hz and 1000 Hz centred around a resonance frequency of resonating member 640. In the example, the resonance frequency is comprised in a frequency range between 100 Hz and 1000 Hz, more particularly between 200 Hz and 300 Hz. The frequency range exhibiting the rather flat shape thus extends over more than an octave band having a center frequency corresponding to the resonance frequency of the resonant member. In some instances, the frequency range exhibiting the rather flat shape may extend over at least a third-octave band having a center frequency corresponding to the resonance frequency of the resonant member.

A second impedance curve 812 can be obtained by decreasing resistance R by a factor of 0.5 as compared to the above value. A third impedance curve 813 can be obtained by decreasing resistance R by a factor of 0.1 as compared to the above value. As the value of R decreases, an increasing peak can be observed around the resonance frequency. A fourth impedance curve 814 can be obtained by increasing resistance R by a factor of 2 as compared to the above value. A fifth impedance curve 815 can be obtained by increasing resistance R by a factor of 10 as compared to the above value. As the value of R increases, an increasing valley can be observed around the resonance frequency. At the same time, an increase of two peaks flanking the valley can be observed.

In some implementations, a substantially constant behaviour of impedance Z may be desirable within a frequency range including the resonance frequency of resonating member 640. Applying this relation in a real device, as exemplified by hearing device 101, 201, 301, 401, 501, may require that resonant member 140, 240, 340, 440, 540, 550 is configured to effect an acoustic impedance Z varying by at most a factor of two, in some instances at most by a factor of 1.5, from a value of the impedance Z at the resonance frequency of resonant member 140, 240, 340, 440, 540. The frequency range may extend over at least one third-octave band having a center frequency corresponding to the resonance frequency of the resonant member. In some instances, the frequency range may extend over at least one octave band having a center frequency corresponding to the resonance frequency of the resonant member.

The acoustic impedance Z, as displayed in graph 801, may correspond to an impedance value measurable in acoustic arrangement 601 at a boundary of second cavity 612 as defined by second container 621, which is illustrated by an arrow 631 in FIG. 6. In a real device, as exemplified by hearing device 101, 201, 301, 401, 501, a corresponding value of Z may be measurable at a boundary of second chamber 106 as defined by partition 115, 315, 415, 515. Impedance Z may be measured in the hearing device by producing an acoustic flow from partition 115, 315, 415, 515 into second chamber 106 and detecting an acoustic pressure at partition 115, 315, 415, 515.

Figure 9:
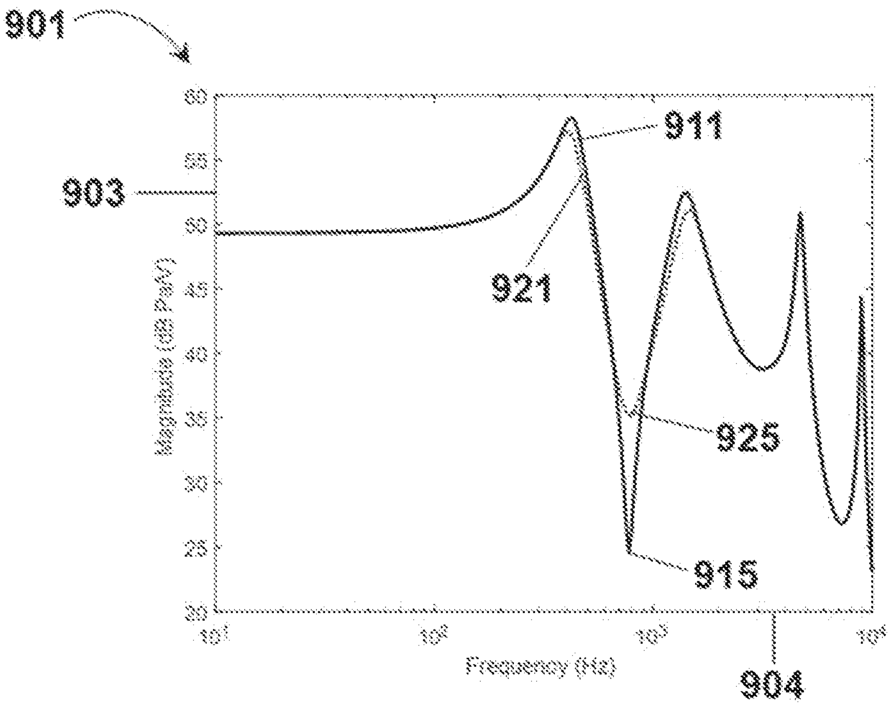
FIG. 9 is an exemplary graph of frequency responses of a hearing device, in accordance with some embodiments of the present disclosure.

FIG. 9 depicts a graph 901 illustrating an impact of a resonating member on the frequency response of a hearing device by means of a concrete example. A frequency is displayed over an axis of abscissas 904 and a sound pressure is displayed over an axis of ordinates 903. A first curve 911 represents a frequency response of a first hearing device comprising an acoustic port acoustically coupling the second chamber to the ambient environment. A resonance of the second chamber with the acoustic port produces a dip 915 in frequency response curve 911. In the example, the resonance is comprised in a frequency range between 100 Hz and 1000 Hz, more particularly between 700 Hz and 900 Hz.

A second curve 921 represents a frequency response of a second hearing device further including a resonant member acoustically coupled to the second chamber. The second hearing device may be implemented by hearing device 101, 201, 301, 401, 501. The resonance frequency of the resonant member is matched to the resonance of second chamber 106 with acoustic port 135, 335. In this way, a dip 925 at the resonance of second chamber 106 with acoustic port 135, 335 can be diminished in frequency response curve 921 as compared to dip 915 in frequency response curve 911. The resonant member can thus allow to adjust the frequency response of hearing device 101, 201, 301, 401, 501 to a desired behaviour within a well defined frequency range adjustable by the acoustic design of the resonant member.

While the principles of the disclosure have been described above in connection with specific devices and methods, it is to be clearly understood that this description is made only by way of example and not as limitation on the scope of the invention. The above described preferred embodiments are intended to illustrate the principles of the invention, but not to limit the scope of the invention. Various other embodiments and modifications to those preferred embodiments may be made by those skilled in the art without departing from the scope of the present invention that is solely defined by the claims.

The invention claimed is:

1. A hearing device configured to be at least partially inserted into an ear canal, the hearing device comprising:
- an acoustic transducer having a membrane configured to generate sound waves;
- a housing enclosing a first chamber and a second chamber acoustically coupled by the membrane;
- a sound outlet configured to release sound waves from the first chamber into the ear canal;
- an acoustic port acoustically coupling the second chamber to an ambient environment outside the ear canal; and
- a mechanical resonator configured to resonate with sound waves at a resonance frequency, wherein the second chamber is acoustically coupled to the mechanical resonator.

2. The hearing device according to claim 1, characterized in that the mechanical resonator comprises a displaceable mass and an elastic coupling counteracting a displacement of the mass, the mass comprising an interaction face at which sound waves can interact with the mass.

3. The hearing device according to claim 1, characterized in that the resonance frequency is a first resonance frequency, wherein the second chamber resonates with the acoustic port at a second resonance frequency, wherein the first resonance frequency deviates from the second resonance frequency at most by one octave.

4. The hearing device according to claim 1, further comprising a resistive member configured to attenuate sound waves interacting with the mechanical resonator.

5. The hearing device according to claim 1, characterized in that the resonance frequency comprises a frequency between 100 Hz and 5000 Hz.

6. The hearing device according to claim 1, characterized in that the mechanical resonator is configured to effect an acoustic impedance measurable at the membrane toward the second chamber, wherein, within a third-octave band having a center frequency corresponding to the resonance frequency of the mechanical resonator, the impedance has an absolute value varying by at most a factor of two relative to an absolute value of the impedance at the resonance frequency of the mechanical resonator.

7. The hearing device according to claim 1, characterized by a microphone and a control circuit connected to the microphone and the acoustic transducer, the control circuit configured to provide for active noise cancelling.

8. The hearing device according to claim 1, wherein the mechanical resonator comprises:
- a mass displaceable relative to the second chamber; and
- an elastic member coupled with the mass such that the elastic member is configured to counteract displacement of the mass.

9. The hearing device according to claim 8, wherein the mass includes an interaction face oriented toward the second chamber such that the interaction face is configured to interact with the sound waves from the second chamber to affect displacement of the mass.

10. The hearing device according to claim 8, wherein the mass is moveably coupled to the housing.

11. The hearing device according to claim 10, wherein the mass is suspended relative to the housing by the elastic member.

12. The hearing device according to claim 8, wherein the mechanical resonator further comprises a container enclosing a cavity, wherein the mass and the elastic member are positioned inside the cavity.

13. The hearing device according to claim 12, wherein the container forms an opening oriented toward the second chamber, wherein the mass is positioned to extend across the opening of the container between the second chamber and the cavity.

14. The hearing device according to claim 12, wherein the cavity is separate from the second chamber.

15. The hearing device according to claim 8, wherein the mechanical resonator further comprises a resistive member coupled with the mass such that the resistive member is configured to resist motion of the mass.

16. The hearing device according to claim 15, wherein the resistive member is configured to attenuate sound waves interacting with the mass.

17. The hearing device according to claim 15, wherein the resistive member is placed in series with the elastic member.

18. The hearing device according to claim 15, wherein the resistive member is placed in parallel with the elastic member.

* * * * *